(12) United States Patent
Burchfiel

(10) Patent No.: US 7,609,935 B2
(45) Date of Patent: Oct. 27, 2009

(54) OPTICAL VECTOR MODULATOR

(75) Inventor: Jerry D. Burchfiel, Waltham, MA (US)

(73) Assignee: BBN Technologies, Cambridge, MA (US)

( * ) Notice: Subject to any disclaimer, the term of this patent is extended or adjusted under 35 U.S.C. 154(b) by 399 days.

(21) Appl. No.: 11/690,240

(22) Filed: Mar. 23, 2007

(65) Prior Publication Data

US 2008/0232820 A1  Sep. 25, 2008

(51) Int. Cl.
G02B 6/00 (2006.01)
(52) U.S. Cl. .......................... 385/147; 385/15; 385/24; 398/182; 398/183
(58) Field of Classification Search .................. 385/15, 385/24, 147; 398/182, 183
See application file for complete search history.

(56) References Cited

U.S. PATENT DOCUMENTS 7,368,890 B2 * 5/2008 Pande et al. ................. 318/812

2007/0249300 A1 * 10/2007 Sorrells et al. ........... 455/114.2

* cited by examiner

Primary Examiner—Jennifer Doan
(74) Attorney, Agent, or Firm—Kurt Rauschenbach; Rauschenbach Patent Law Group, LLC

(57) ABSTRACT

An optical vector modulator includes an information generator that generates a plurality of N-bit streams at an output where each of the plurality of N-bit streams represents a desired modulation point in a signaling constellation. A memory look-up table having an N-bit address input retrieves a first and a second stored value that corresponds to the N-bit address input, where each of the first and the second stored value represent a respective one of a first and a second modulation vector of a desired modulation point in the signaling constellation. A first and a second digital-to-analog converter generates first and second analog signals, respectively, that correspond to respective ones of the first and second modulation vectors of the desired modulation points in the signaling constellation. A dual-drive interferometric modulator modulates the first and the second analog signals on the optical beam to obtain the desired modulation points in the signaling constellation.

25 Claims, 4 Drawing Sheets

OPTICAL VECTOR MODULATOR

BACKGROUND OF THE INVENTION

The section headings used herein are for organizational purposes only and should not to be construed as limiting the subject matter described in the present application.

The present invention relates to methods and apparatus for achieving optical signaling near baseband limits. The term "optical signal" as used herein is equivalent to the term "optical modulation." The original low frequency components of a signal before modulation are often referred to as the baseband signal. A signal's "baseband bandwidth" is defined herein as its bandwidth before modulation and multiplexing or after demuliplexing and demodulation.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed description about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Figure 1:
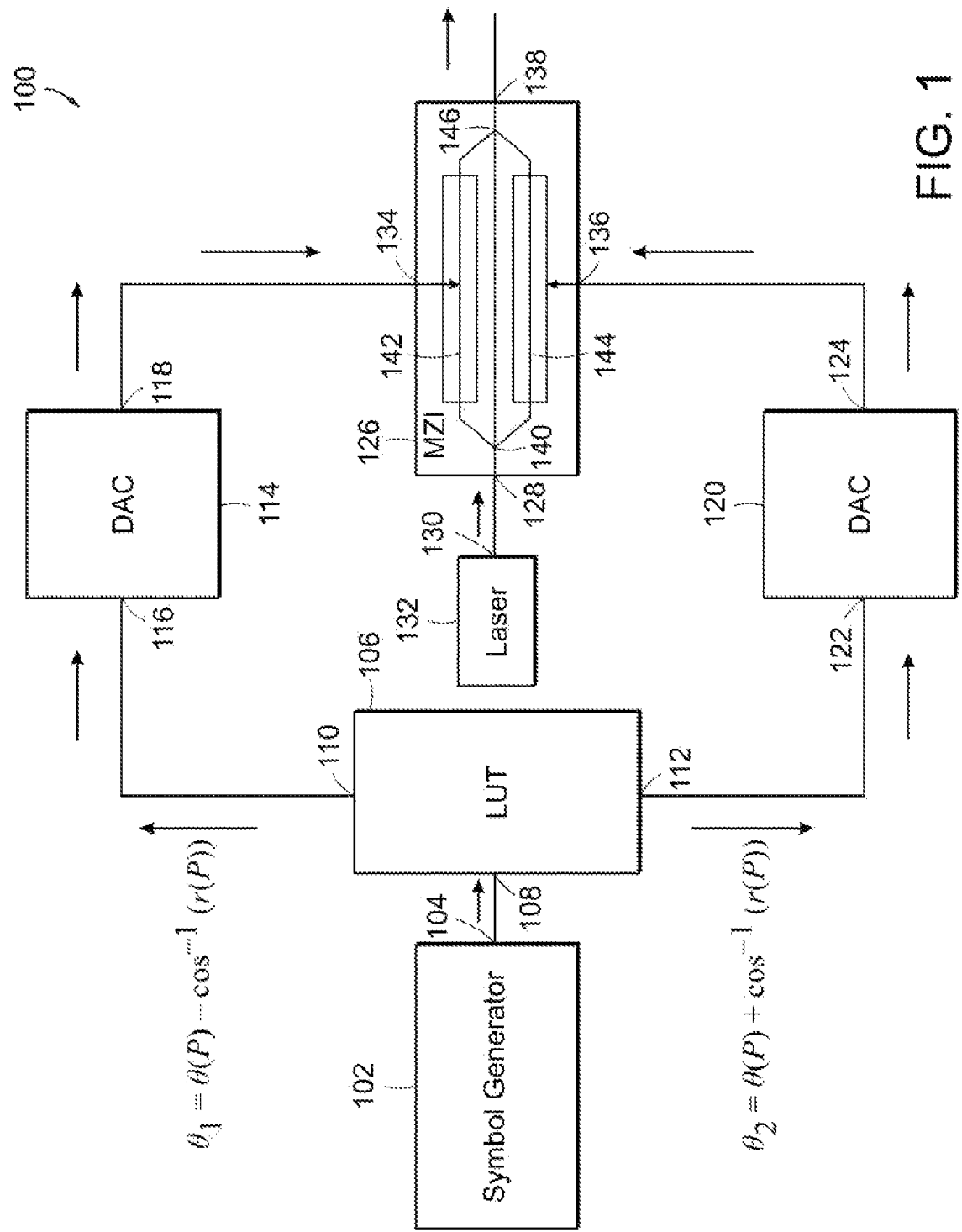
FIG. 1 is a block diagram of one embodiment of an optical vector modulator according to the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. For example, some aspects of the optical vector modulator of the present invention are described in connection with using a Mach-Zehnder interferometric modulator to modulate quadrature amplitude modulation signal constellations. It is understood that the optical vector modulator of the present invention can be implemented with other types of dual-drive modulators and that other types of modulation signal constellations can be used.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

An optical vector modulator according to the present invention uses a dual-drive modulator to produce arbitrary coherent optical modulation signal constellations. In one embodiment, the optical vector modulator of the present invention produces arbitrary coherent Quadrature Amplitude Modulation (QAM) signal constellations.

Quadrature amplitude modulation is a modulation scheme that conveys data by changing or modulating the amplitude of two carrier waves. The two carrier waves, which are typically sinusoidal waves, are out-of-phase with respect to each other by 90 degrees. These two carrier waves are sometimes called quadrature carrier waves in the literature. The two modulated signals are sometimes referred to as the I-signal and the Q-signal. Quadrature amplitude modulation can be used to modulate analog or digital signals, however, QAM is most commonly used to modulate digital signals.

The constellation points for quadrature amplitude modulation in a constellation diagram are typically arranged in a square grid with equal vertical and horizontal spacing. The number of points on the grid is a power of two for binary digital data. The most common forms of quadrature amplitude modulation are 4-QAM, 16-QAM, 64-QAM, 128-QAM, and 256-QAM. Using a higher order constellation allows the transmission of more bits per symbol.

Typically, known QAM modulation systems use one optical modulator to modulate light in the I-Channel and another optical modulator to modulate light in the Q-Channel. Each of the optical modulators is modulated with the appropriate quadrature signal. Nonlinearlities inherent in optical modulator often require the use of active compensation devices, such as feed-forward linearlization, in many systems. The use of active compensation devices is undesirable because such devices add complexity and cost to the transmission system. Active compensation devices also require additional power.

Alternatively, some systems operate at relatively low modulation levels to minimize nonlinearities that are inherent in the optical modulator. However, operating at relatively low levels of modulation is usually undesirable because it results in the generation of low-amplitude modulated optical signal.

The optical vector modulator of the present invention has numerous features and advantages over prior art optical vector modulators. For example, one feature of the present invention is that the optical vector modulator includes only one dual-drive optical modulator, which eliminates the cost, size, and complexity of the system. Another feature of the optical vector modulator is that the optical vector modulator of the present invention can virtually eliminate modulation nonlinearlities.

FIG. 1 is a block diagram of one embodiment of an optical vector modulator 100 according to the present invention. The optical vector modulator 100 includes an information generator 102 that generates a plurality of N-bit streams at an output 104. Each of the plurality of N-bit streams represents a desired modulation point in a signaling constellation. In various embodiments, the information generator 102 generates the N-bit streams in various data formats that are known in the art. In one embodiment, the N-bit streams are QAM pulse streams.

A memory look-up table 106 having an N-bit address input 108 is electrically connected to the output 104 of the information generator 102. The memory look-up table 106 retrieves a first and a second stored value at a first 110 and a second output 112 when N-bit data is applied to the N-bit address input 108. In many embodiments, the memory look-up table 106 stores 2N different values. In some embodiments, the information generator 102 and the memory look-up table 106 comprise at least one digital memory device that stores the desired first and second stored values.

Each of the first and the second stored values represent a respective one of a first and a second modulation vector of a desired modulation point in the signaling constellation as described herein. In one embodiment, the desired modulation point in the signaling constellation comprises a QAM modulation point in a QAM constellation. In the embodiments shown in FIG. 1 the first modulation vector has a phase that is equal to $\theta 1=\theta(P)-\cos^{-1}(r(P))$ and the second modulation vector has a phase that is equal to $\theta 2=\theta(P)+\cos^{-1}(r(P))$. In many embodiments, the amplitude of the first modulation vector is substantially equal to the amplitude of the second modulation vector.

A first digital-to-analog converter 114 having an input 116 that is coupled to the first output 110 of the memory look-up table 106 and an output 118. A second digital-to-analog converter 120 having an input 122 that is coupled to the first output 112 of the memory look-up table 106 and an output 124. The first and the second digital-to-analog converters 114, 120 generate first and second analog signals, respectively, at respective outputs 118, 124 that correspond to the first and second modulation vectors of the desired modulation points in the signaling constellation. In one embodiment, the memory look-up table 106 and at least one of the first and second digital-to-analog converters 114, 120 are a single device.

A dual-drive electro-optic modulator 126 is configured to modulate an optical beam with the first and second analog signals. The dual-drive modulator 126 includes an optical input 128 that is coupled to an output 130 of an optical source 132. In many embodiments, the optical source 132 is a semiconductor laser. The modulator 126 also includes a first 134 and a second electrical modulation input 136 that is coupled to a respective output 118, 124 of the first and second digital-to-analog converters 114, 120. The modulator 126 modulates the first and the second analog signals on the optical beam and generates the desired modulation points in the signaling constellation at the modulator output 138.

In the embodiment shown in FIG. 1, the modulator 126 is a dual-drive Mach-Zehnder Interferometric (MZI) modulator. Many known QAM modulation systems use single drive MZI modulators to modulate data on an optical beam and such modulators are well known and widely used in the art. A MZI modulator is an external optical modulator that modulates optical power (i.e. intensity modulation) with an applied electrical modulation signal.

A MZI modulator is constructed by forming optical waveguides in an electro-optic substrate, such as a lithium niobate substrate. A single input waveguide 140 splits into a first 142 and a second arm 144 of an interferometer. The first and second arms 142, 144 are then combined into a single output waveguide 146. In the dual-drive MZI modulator illustrated in FIG. 1, both the first and second arms 142, 144 include electrical modulation electrodes that modulate the first and the second analog signals on the optical beam to obtain the desired modulation points in the signaling constellation.

Numerous types of MZI modulators can be used. For example, the dual-drive modulator 126 can be one of an X-cut lithium niobate optical modulator, an X-cut lithium tantalate optical modulator, a Z-cut lithium niobate optical modulator, a Z-cut lithium tantalate optical modulator, an electro-optic semiconductor modulator, an electro-optic inorganic modulator, and an electro-optic organic modulator.

Most modulators are driven to maximize modulation. To achieve maximum modulation, the first and second analog signals are chosen to be 180 degrees out-of-phase with respect to one another, so that constructive interference occurs at the output 138 of the modulator 126. To achieve minimum modulation, the first and second analog signals are chosen to have the same amplitude and phase so that cancellation occurs at the output 138 of the modulator 126. The optical vector modulator of the present invention is typically driven so that the first and the second modulation vector achieve a resultant vector that points to a desired modulation point in the desired signaling constellation In some embodiments of the present invention, the first and the second stored values in the look-up table 106 are specifically chosen to at least partially compensate for non-linear effects introduced by the dual drive modulator 126 during modulation and/or introduced by other non-linear effects. In these embodiments, the first and the second stored values in the look-up table 106 are specifically chosen to result in the modulator 126 generating desired modulation points in the desired modulation constellation that compensate for any non-ideal behavior of the modulator 126. In addition, in some embodiments, the first and the second stored values in the look-up table 106 are specifically chosen to at least partially velocity match the first and second analog signals to the optical beam generated by the optical source 132.

A method of optical vector modulation according to the present invention includes generating a plurality of N-bit streams. Each of the plurality of N-bit streams represents a desired modulation point in a desired signaling constellation. For example, the desired modulation points in the signaling constellation can be QAM modulation points. A first and a second stored value are retrieved for each of the N-bit streams. The first and the second stored values represent a first and a second modulation vector of a desired modulation point in the desired signaling constellation. The first and second stored values can be retrieved from one of at least $2^n$ possible digital symbol values in a digital memory look-up table.

In one embodiment, the first stored value represents a first modulation vector with a phase that is equal to $\theta 1=\theta(P)-\cos^{-1}(r(P))$ and the second stored value represents a second modulation vector with a phase that is equal to $\theta 2=\theta(P)+\cos^{-1}(r(P))$ as described in connection with the vector diagram illustrated in FIG. 2.

In various embodiments, at least some of the first and the second stored values are chosen to improve or maximize the performance and/or accuracy of the optical vector modulator. For example, at least some of the first and the second stored values can be chosen to reduce non-linear effects introduced during modulation and/or introduced by other non-linear effects so that the desired modulation point are achieved regardless of any non-ideal behavior of the modulator or other parts of the system. In addition, at least some of the first and the second stored values can be chosen to approximately velocity match the first and second analog signal to the optical beam in order to improve modulation efficiency. First and second analog signals are then generated with digital-to-analog converters from respective ones of the first and the second stored values that represent the first and the second modulation vectors of the desired modulation points.

In the case of a MZI modulator, the optical beam is split into the first 142 and the second arm 144 of the MZI. The optical beam in the first arm 142 is modulated with the first analog signal that represents the first modulation vector and the optical beam in the second arm 144 is modulated with the second analog signal that represents the second modulation vector. The first and second analog signals modify the index of refraction of the electro-optic material, which results in a phase change in the optical beam that corresponds to a respective one of the first and the second modulation vectors. The first and second optical beams are combined and the resultant modulation vector points to a desired modulation points in the desired signaling constellation.

In some embodiments, the bias of the modulator that modulates the optical beam with the first and the second analog signals is adjusted to improve the modulation efficiency or other modulation parameters. For example, the bias of the modulator that modulates the optical beam with the first and the second analog signals can be adjusted to reduce non-linear effects introduced during modulation and introduced during other non-linear processes.

Figure 2:
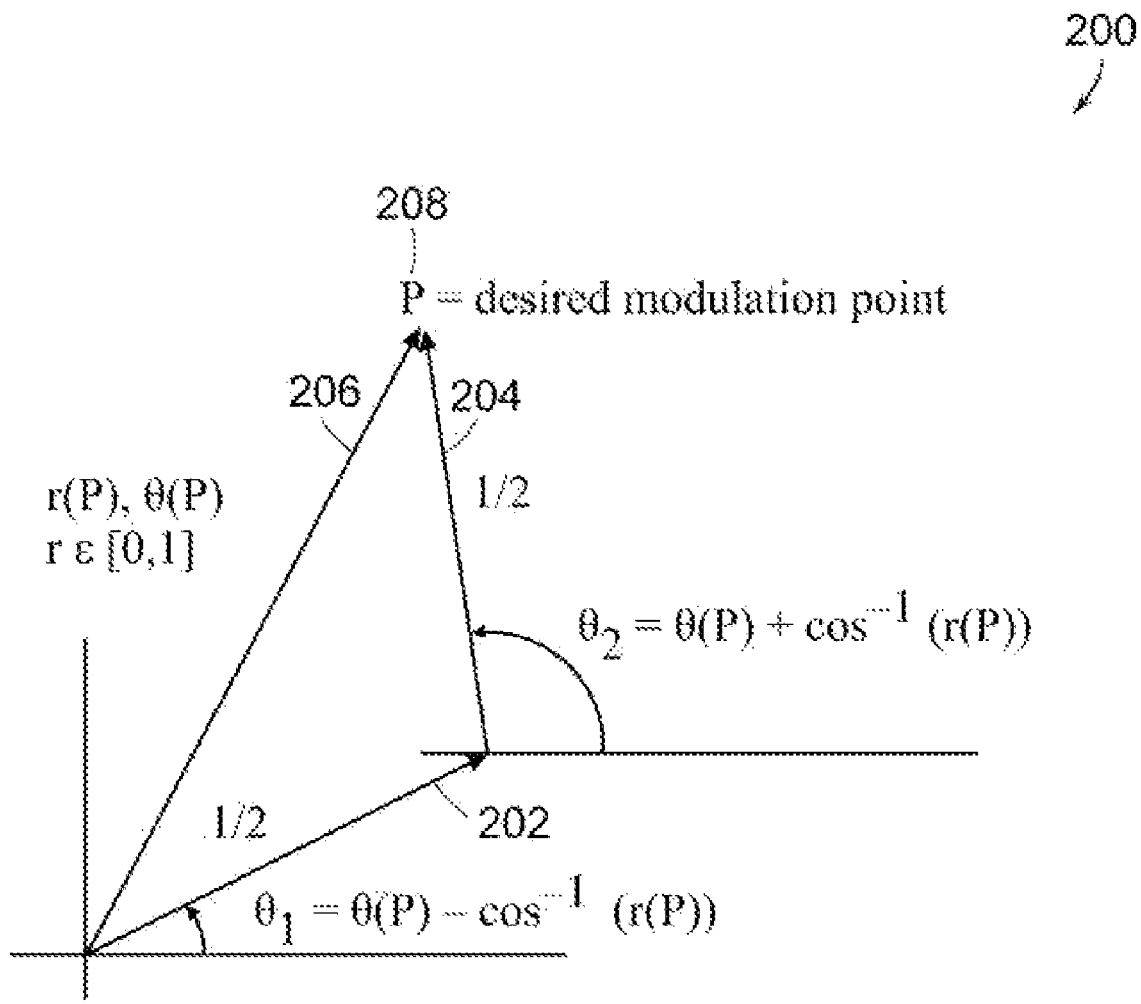
FIG. 2 is a vector representation illustrating the modulation of a desired modulation point in a desired modulation signal constellation using the optical vector modulator of the present invention.

FIG. 2 is a vector representation 200 illustrating the modulation of a desired modulation point in a desired modulation signal constellation using the optical vector modulator of the present invention. The vector representation 200 illustrates how the optical vector modulator of the present invention can be used to produce arbitrary coherent optical modulation constellations.

The vector representation 200 includes a first modulation vector 202 that represents the signal generated by the first digital-to-analog converter 114, which is applied to the first arm 142 of the dual-drive modulator 126. The vector representation 200 also includes a second modulation vector 204 that represents the signal generated by the second digital-to-analog converter 120, which is applied to the second arm 144 of the dual-drive modulator 126. In addition, the vector representation 200 includes a resultant vector 206 that represents the vector combination of the first and the second modulation vectors 202, 204. The resultant vector 206 points to the desired modulation point P 208.

In the embodiment illustrated in FIG. 2, the modulation point P has polar coordinates r(P) and θ(P) where r is in [0,1]. The first and second modulation vectors 202, 204 have an equal magnitude that is indicated as one half in the vector representation 200. In other embodiments, the magnitudes of the first and second modulation vectors 202, 204 are equal but greater than or less than one half. In yet other embodiments, the magnitudes of the first and second modulation vectors 202, 204 are not equal.

The phase of the first and second modulation vectors 202, 204 are not equal and are chosen to obtain the desired resultant modulation vector. In the embodiment shown in FIG. 2, the phase of the first modulation vector 202 is $\theta1=\theta(P)-\cos^{-1}(r(P))$ and the phase of the second modulation vector 204 is $\theta2=\theta(P)+\cos^{-1}(r(P))$. Thus, in the embodiment shown in FIG. 2, each pair of pre-programmed voltages stored in the look-up table 106 (FIG. 1) have the same magnitude, but have different phases that are determined by the above equation for θ1 and θ2.

In practice, arbitrary coherent optical modulation constellations are obtained by selecting the proper pairs of pre-programmed voltages stored in the memory look-up table 106 shown in FIG. 1 (or some other memory device). These pairs of voltages are then applied to the respective arms 142, 144 of the dual-drive modulator 126 for each modulation point of the desired constellation.

Non-linearities inherent in the modulator 126 can be compensated for by properly selecting the pairs of pre-programmed voltages in the look-up table 106 (FIG. 1). The pairs of pre-programmed voltages are chosen so that the modulation points are accurately produced at the desired locations regardless of the non-linearities introduced during modulation and/or by other system non-linearities.

For example, these non-linearities can be physically measured and the resulting measurements can be used to correct the entries in the look-up table 106 so that the values stored in the look-up table 106 accurately compensate for these non-linearities. The total effects of all non-linear behaviors can be measured and these measurements can be used to correct the entries in the look-up table 106. Alternatively, the effect of one particular non-linearity, such as non-linearities caused by modulation, can be measured and these measurements can be used to correct the entries in the look-up table 106. Therefore, when the corrected entries in the look-up table 106 are applied to the respective arms 142, 144 of the dual-drive modulator 126, the desired modulation points in the constellation are obtained.

A method of optical modulation according to the present invention can include only the steps of generating a first and second analog signal with amplitudes and phases that correspond to the desired first and second modulation vectors and then modulating the first and second analog signals with a dual drive optical modulator. Thus, in one embodiment of the present invention, a method of optical modulation according to the present invention includes generating a first analog signal having an amplitude and a phase that corresponds to a first modulation vector of a desired modulation point within a signaling constellation.

A second analog signal is generated having an amplitude and a phase that corresponds to a second modulation vector of a desired modulation point within a signaling constellation. An optical beam is then modulated with the first and second analog signals. In one embodiment, the phase of the first modulation vector is equal to $\theta1=\theta(P)-\cos^{-}(r(P))$ and the phase of the second modulation vector is equal to $\theta2=\theta(P)+\cos^{-}(r(P))$ as described herein. In many embodiments, the amplitude of the first and second modulation vectors are substantially the same for simplicity as described in connection with FIG. 2. However, in other embodiments, the amplitude of the first and second modulation is different.

In various embodiments, the amplitude and phase of at least one of the first and second analog signal are chosen to improve or maximize the modulation efficiency or the other modulation parameters. For example, the amplitude and phase of the at least one of the first and second analog signal can be chosen to reduce non-linear effects introduced during modulation and introduced by other non-linear effects. In addition, the amplitude and phase of at least one of the first and second analog signal can be chosen to approximately velocity match the first and second analog signal to the optical beam in order to improve modulation efficiency. Also, in some embodiments, the bias of the modulator 126 that modulates the optical beam with the first and the second analog signals is adjusted to improve the modulation efficiency or other modulation parameters.

Figure 3:
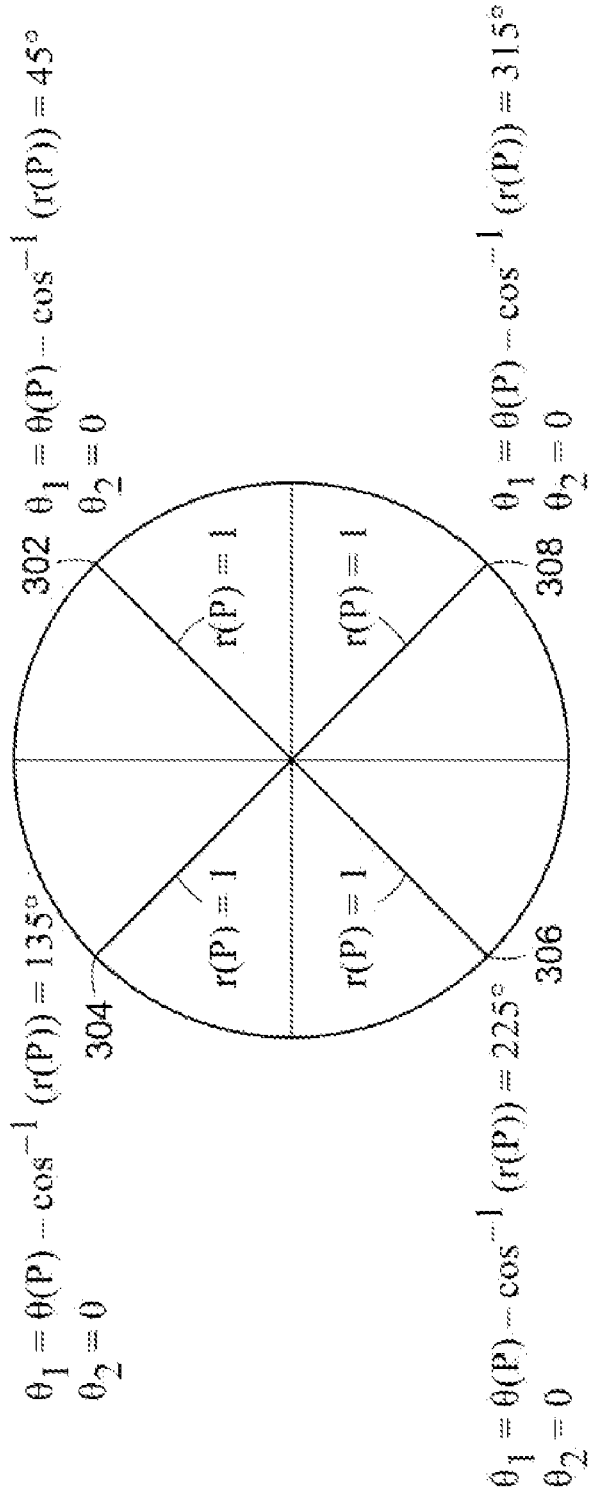
FIG. 3 illustrates a 4QAM modulation constellation indicating the polar coordinates r(P) and θ(P) for each modulation point in the constellation.

FIG. 3 illustrates a 4QAM modulation constellation 300 indicating the polar coordinates r(P) and θ(P) for each modulation point in the constellation. It is relatively easy to compute the polar coordinates r(P) and θ(P) for the 4QAM modulation points where r is in [0,1]. The radius r(P) is equal to one for each of the 4QAM modulation points. The angle θ1(P) is determined by the equation $\theta1=\theta(P)-\cos^{-1}(r(P))$. Since the radius r(P) is equal to one, the angle θ1 is equal to θ(P), which is equal to 45 degrees, 135 degrees, 225 degrees, and 315 degrees for the four modulation points. In the 4QAM modulation constellation, the angle θ2 is always equal to zero.

Each of the 4QAM modulation points can be obtained by selecting the appropriate pair of pre-programmed voltage pairs in the look-up table 106 (FIG. 1) and applying these voltages to the respective arms 142, 144 of the dual-drive modulator 126. Nonlinearities inherent in the modulator can be compensated by proper selection of the pre-programmed voltages so that the modulation points are accurately produced on the 4×4 grid as described herein.

Figure 4:
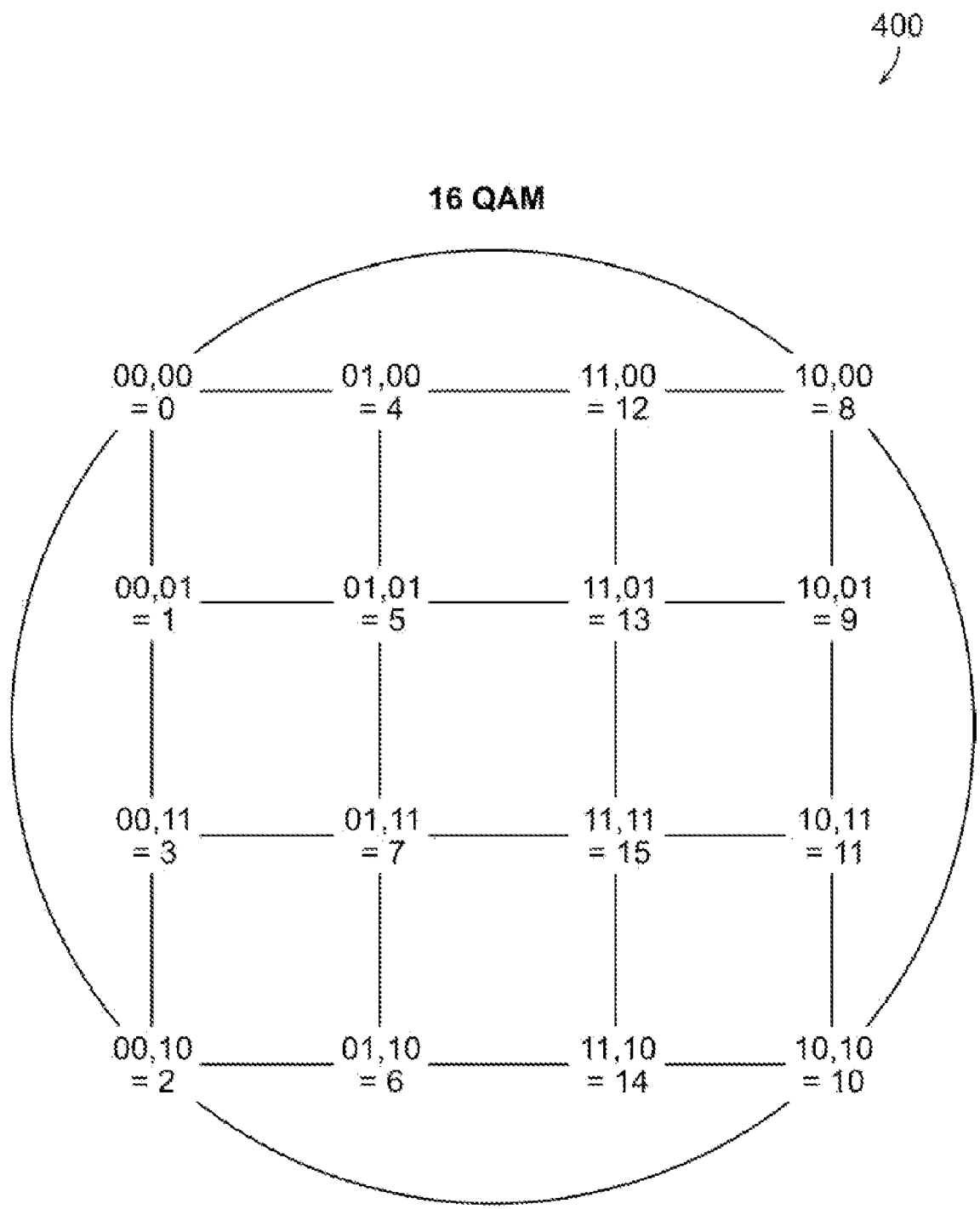
FIG. 4 illustrates a 16QAM modulation constellation indicating the polar coordinates r(P) and θ(P) for each modulation point in the constellation.

FIG. 4 illustrates a 16QAM modulation constellation 400 indicating the polar coordinates r(P) and θ(P) for each modulation point in the constellation. The radius r(P) is equal to one half for each of the 16QAM modulation points as described in connection with FIG. 2. The angle θ1 (P) is determined by the equation $\theta 1 = \theta(P) - \cos^{-1}(r(P))$. Each of the 16QAM modulation points can be obtained by selecting the appropriate pair of pre-programmed voltage pairs in the look-up table 106 (FIG. 1) and applying these voltages to the respective arms 142, 144 of the dual-drive modulator 126. Nonlinearities inherent in the modulator can be compensated by proper selection of the pre-programmed voltages so that the modulation points are accurately produced on the 4×4 grid as described herein.

Equivalents

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention as defined by the appended claims.

What is claimed is:

1. An optical vector modulator comprising:
   a) an information generator that generates a plurality of N-bit streams at an output, each of the plurality of N-bit streams representing a desired modulation point in a signaling constellation;
   b) a memory look-up table having an N-bit address input that is electrically connected to the output of the information generator, the memory look-up table retrieving a first and a second stored values at a first and a second outputs that corresponds to the N-bit address input, each of the first and the second stored values representing a respective one of a first and a second modulation vectors of a desired modulation point in the signaling constellation;
   c) a first and a second digital-to-analog converters each having an input that is coupled to a respective one of the first and the second outputs of the memory look-up table, the first and the second digital-to-analog converters generating first and second analog signals, respectively, at an output that corresponds to respective ones of the first and second modulation vectors of the desired modulation points in the signaling constellation; and
   d) a dual-drive interferometric modulator having an optical input that is coupled to an output of an optical source, and a first and a second electrical modulation input that is coupled to a respective output of the first and second digital-to-analog converters, the modulator modulating the first and the second analog signals on the optical beam to obtain the desired modulation points in the signaling constellation.

2. The optical vector modulator of claim 1 wherein the first modulation vector comprises a phase equal to $\theta 1 = \theta(P) - \cos^{-1}(r(P))$ and the second modulation vector comprises a phase equal to $\theta 2 = \theta(P) + \cos^{-1}(r(P))$.

3. The optical vector modulator of claim 2 where an amplitude of the first modulation vector is substantially equal to an amplitude of the second modulation vector.

4. The optical vector modulator of claim 1 wherein the memory look-up table store $2^n$ values.

5. The optical vector modulator of claim 1 wherein the dual-drive interferometric modulator comprises a dual-drive mach-Zehnder interferometric modulator.

6. The optical vector modulator of claim 1 wherein the first and the second stored values are chosen to at least partially compensate for non-linear effects introduced during modulation.

7. The optical vector modulator of claim 1 wherein the first and the second stored values are chosen to at least partially velocity match the first and second analog signals to the optical beam.

8. The optical vector modulator of claim 1 wherein the desired modulation point in the signaling constellation comprises a QAM modulation point.

9. The optical vector modulator of claim 1 wherein the memory look-up table and at least one of the first and second digital-to-analog converters comprise a single device.

10. A method of optical vector modulation comprising:
    a) generating a plurality of N-bit streams, each of the plurality of N-bit streams representing a desired modulation point in a signaling constellation;
    b) retrieving a first and a second stored values for each of the N-bit streams, each of the first and the second stored values representing a first and a second modulation vectors of a desired modulation point in the signaling constellation;
    c) generating first and second analog signals from respective ones of each of the first and the second stored values representing the first and the second modulation vectors of the desired modulation points; and
    d) modulating an optical beam with the first and the second analog signals that represent the first and the second modulation vectors to generate the desired modulation points in the signaling constellation.

11. The method of claim 10 wherein the first modulation vector comprises a phase equal to $\theta 1 = \theta(P) - \cos^{-1}(r(P))$ and the second modulation vector comprises a phase equal to $\theta 2 = \theta(P) + \cos^{-1}(r(P))$.

12. The method of claim 10 wherein the retrieving the first and second stored values comprises retrieving one of $2^n$ possible digital symbol values.

13. The method of claim 10 wherein at least one of the first and the second stored values is chosen to approximately velocity match the first and second analog signals to the optical beam.

14. The method of claim 10 wherein at least one of the first and the second stored values is chosen to reduce non-linear effects introduced during modulation.

15. The method of claim 10 wherein the desired modulation points in the modulation constellation comprise QAM modulation points.

16. The method of claim 10 further comprising adjusting a bias of a modulator modulating the optical beam to reduce non-linear effects introduced during modulation.

17. A method of optical modulation comprising:
    a) generating a first analog signal having an amplitude and a phase that corresponds to a first modulation vector of a desired modulation point within a signaling constellation;
    b) generating a second analog signal having an amplitude and a phase that corresponds to a second modulation vector of a desired modulation point within a signaling constellation;
    c) modulating an optical beam with the first and second analog signals, the modulated optical beam having a desired modulation point in the signaling constellation that is defined by the first and second modulation vectors.

18. The method of claim 17 wherein the first modulation vector comprises a phase equal to $\theta1=\theta(P)-\cos^{-1}(r(P))$ and the second modulation vector comprises a phase equal to $\theta2=\theta(P)+\cos^{-1}(r(P))$.

19. The method of claim 17 wherein the generating the first and second analog signals comprises retrieving predetermined analog signals stored in a look-up table.

20. The method of claim 17 wherein the predetermined analog signals stored in a look-up table correspond to particular N-bit streams.

21. The method of claim 17 wherein the amplitude and phase of at least one of the first and the second analog signals is chosen to approximately velocity match the first and second analog signals to the optical beam.

22. The method of claim 17 wherein the amplitude and phase of at least one of the first and the second analog signals is chosen to reduce non-linear effects introduced during modulation.

23. The method of claim 17 wherein the desired modulation point in the modulation constellation comprises QAM modulation points.

24. The method of claim 17 further comprising adjusting a bias of a modulator modulating the optical beam to reduce non-linear effects introduced during modulation.

25. The method of claim 17 wherein the amplitude of the first and second modulation vectors are substantially the same.

* * * * *